US012677312B2

(12) United States Patent
Ye et al.

(10) Patent No.: US 12,677,312 B2
(45) Date of Patent: Jul. 7, 2026

(54) HALF DUPLEX FREQUENCY DIVISION DUPLEX SUPPORT IN NON-TERRESTRIAL NETWORKS

(71) Applicant: Apple Inc., Cupertino, CA (US)

(72) Inventors: Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 17/926,853

(22) PCT Filed: Nov. 24, 2021

(86) PCT No.: PCT/CN2021/132823
§ 371 (c)(1),
(2) Date: Nov. 21, 2022

(87) PCT Pub. No.: WO2023/092336
PCT Pub. Date: Jun. 1, 2023

(65) Prior Publication Data
US 2024/0090015 A1 Mar. 14, 2024

(51) Int. Cl.
H04W 72/566 (2023.01)
H04L 5/16 (2006.01)
H04W 72/1263 (2023.01)

(52) U.S. Cl.
CPC ............. H04W 72/566 (2023.01); H04L 5/16 (2013.01); H04W 72/1263 (2013.01)

(58) Field of Classification Search
CPC .... H04W 72/566; H04W 72/1263; H04L 5/16
See application file for complete search history.

(56) References Cited

U.S. PATENT DOCUMENTS

| | | | |
|---|---|---|---|
| 9,264,205 B2 | 2/2016 | Celebi et al. | |
| 11,805,514 B2 * | 10/2023 | Abotabl | H04W 72/1268 |
| 2023/0018272 A1 * | 1/2023 | Abdelghaffar | H04W 72/23 |
| 2023/0092970 A1 * | 3/2023 | Zhang | H04L 5/0048 |
| | | | 370/277 |

FOREIGN PATENT DOCUMENTS

| | | | | |
|---|---|---|---|---|
| CN | 115104377 A | * | 9/2022 | H04W 48/10 |
| CN | 116076120 A | * | 5/2023 | H04B 7/088 |

(Continued)

*Primary Examiner* — Saad A. Waqas
(74) *Attorney, Agent, or Firm* — Fish & Richardson P.C.

(57) ABSTRACT

Disclosed are methods, systems, and computer-readable medium to perform operations including: determining a scheduling conflict between an uplink transmission and a downlink reception; determining a type of the scheduling conflict; and applying, based on in part on the type of the scheduling conflict, a prioritization rule that prioritizes at least a portion of the uplink transmission or the downlink reception in order to mitigate the scheduling conflict.

20 Claims, 8 Drawing Sheets

(56)     References Cited

FOREIGN PATENT DOCUMENTS

| DE | 102021112595 | | 11/2021 | | |
| FR | 2985124 A1 | * | 6/2013 | ........... | H04W 72/56 |
| WO | WO-2015148997 A1 | * | 10/2015 | ........... | H04W 72/12 |
| WO | WO 2020033716 | | 2/2020 | | |
| WO | WO 2021159297 | | 8/2021 | | |
| WO | WO-2021159297 A1 | * | 8/2021 | ............... | H04L 5/16 |
| WO | WO 2021165215 | | 8/2021 | | |
| WO | WO-2021165215 A1 | * | 8/2021 | .......... | H04W 72/569 |

* cited by examiner

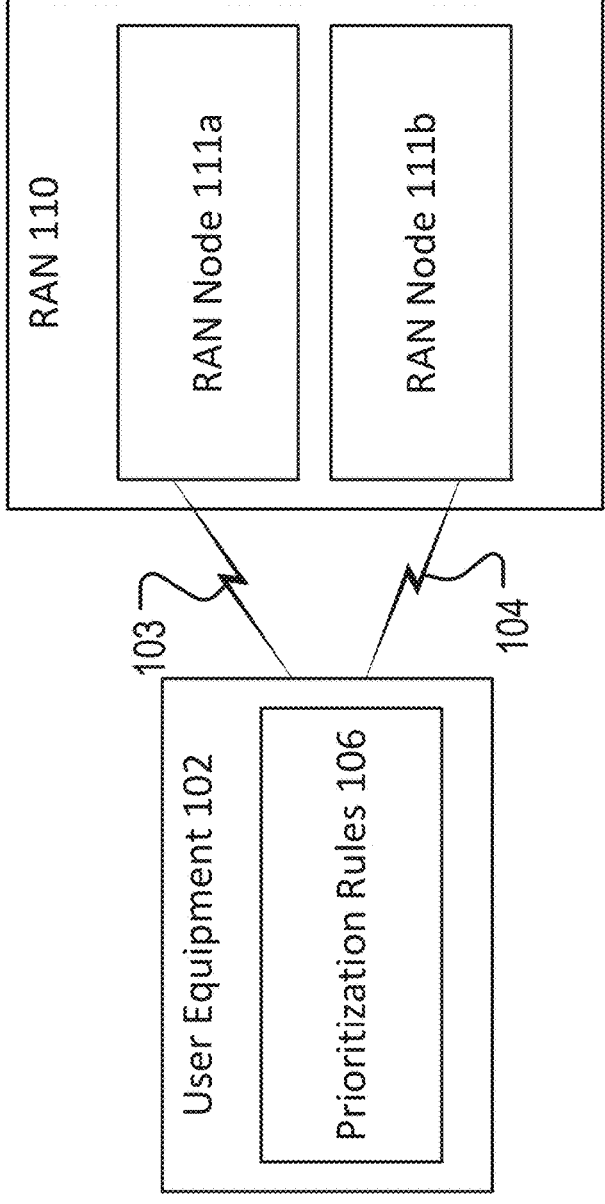
FIG. 1

PUSCH/PUCCH
with guard period

PDSCH

Alt 1: PDSCH
reception on non-
overlap slots

Alt 2: No PDSCH
reception at all

Alt 3: No PDSCH
reception after
overlap slots

300

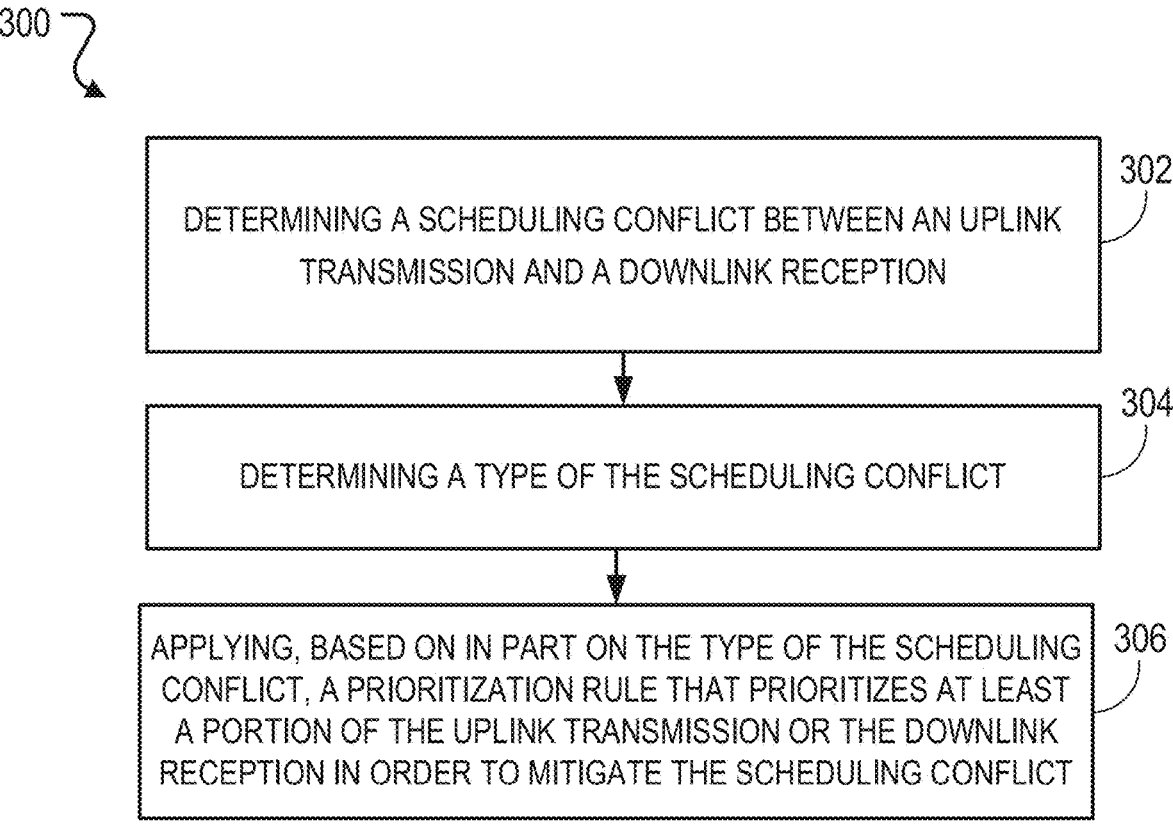

302

DETERMINING A SCHEDULING CONFLICT BETWEEN AN UPLINK
TRANSMISSION AND A DOWNLINK RECEPTION

304

DETERMINING A TYPE OF THE SCHEDULING CONFLICT

306

APPLYING, BASED ON IN PART ON THE TYPE OF THE SCHEDULING
CONFLICT, A PRIORITIZATION RULE THAT PRIORITIZES AT LEAST
A PORTION OF THE UPLINK TRANSMISSION OR THE DOWNLINK
RECEPTION IN ORDER TO MITIGATE THE SCHEDULING CONFLICT

FIG. 3

HALF DUPLEX FREQUENCY DIVISION DUPLEX SUPPORT IN NON-TERRESTRIAL NETWORKS

CROSS-REFERENCE TO RELATED APPLICATIONS

This application claims priority under 35 U.S.C. 371 to International Application No. PCT/CN2021/132823, filed on Nov. 24, 2021, the entire contents of which is hereby incorporated by reference.

TECHNICAL FIELD

This disclosure generally relates to half duplex frequency division duplex support in non-terrestrial networks.

BACKGROUND

To increase network coverage and support use cases that are beyond the capabilities of ground-based (terrestrial) infrastructure, the 3rd Generation Partnership Project (3GPP) has released standards that integrate non-terrestrial networks (NTNs) into the 5G New Radio (NR) framework. In general, an NTN includes a network, or a segment thereof, which uses airborne or space-borne platforms (e.g., non-geo-stationary satellites) to implement access nodes or base stations.

SUMMARY

The present disclosure is directed towards methods, systems, apparatus, computer programs, or combinations thereof, for half duplex frequency division duplex support in non-terrestrial networks (NTNs).

In accordance with one aspect of the present disclosure, a method to be performed by a user equipment (UE) is disclosed. The method involves determining a scheduling conflict between an uplink transmission and a downlink reception; determining a type of the scheduling conflict; and applying, based on in part on the type of the scheduling conflict, a prioritization rule that prioritizes at least a portion of the uplink transmission or the downlink reception in order to mitigate the scheduling conflict.

The previously-described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the method further involves receiving the prioritized portion of the uplink transmission or the downlink reception.

In some implementations, determining a type of the scheduling conflict involves: determining that the type of the scheduled conflict is a conflict without repetition in the uplink transmission and the downlink reception.

In some implementations, the prioritization rule prioritizes between the uplink transmission and the downlink reception based on respective priority indices associated with the uplink transmission and the downlink reception.

In some implementations, applying the prioritization rule involves: comparing the respective priority indices; and determining to prioritize the communication with a higher priority index.

In some implementations, applying the prioritization rule involves: comparing the respective priority indices, determining that the respective priority indices are identical; and in response, performing one of a plurality of alternative options, the alternative options including: (i) prioritizing the uplink transmission, (ii) prioritizing the downlink transmission, (iii) prioritizing the uplink transmission or downlink transmission based on configuration, and (iv) prioritizing based on respective reception times of grants associated with the uplink transmission and the downlink reception.

In some implementations, determining a type of the scheduling conflict involves: determining that the type of the scheduled conflict is a conflict with repetition in at least one of the uplink transmission or the downlink reception.

In some implementations, the prioritization rule prioritizes between the uplink transmission and the downlink reception based on respective priority indices associated with the uplink transmission and the downlink reception.

In some implementations, the downlink reception includes repetition, and applying the prioritization rule involves determining whether the respective priority index of the downlink reception is lower than the respective priority index of the uplink transmission; if the respective priority index of the downlink reception is lower: performing one of a first plurality of alternative options including: (i) prioritizing a first portion of the downlink repetition without time overlap with the uplink transmission, while a second portion of the downlink repetition with time overlap with the uplink transmission is not prioritized, (ii) determining not to prioritize the entire downlink transmission, and (iii) prioritizing a third portion of the downlink repetition before the time overlap with the uplink transmission, while the downlink repetition on or after the time overlap with the uplink transmission is not prioritized; and if the respective priority index of the downlink reception is greater: performing one of a second plurality of alternative options including: (i) prioritizing the first portion of the downlink repetition without time overlap with the uplink transmission, while the second portion of the downlink repetition with time overlap with the uplink transmission is not prioritized, and (ii) prioritizing the entire downlink repetition.

In some implementations, determining a type of the scheduling conflict involves: determining that the type of the scheduled conflict is a conflict that involves a time overlap between an existing communication configuration and a newly scheduled communication.

In some implementations, the existing communication configuration is the uplink transmission, the newly scheduled communication is the downlink reception that overlaps in time with the uplink transmission and that is scheduled by a dynamic grant, and applying the prioritization rule involves: determining that a last symbol of a control resource set including the dynamic grant is no earlier than a threshold time before a first symbol of the uplink transmission; and responsively prioritizing the uplink transmission.

In some implementations, the existing communication configuration is the downlink reception, the newly scheduled communication is the uplink transmission that overlaps in time with the downlink reception and that is scheduled by a dynamic grant, and applying the prioritization rule involves: determining that a last symbol of the control resource set containing the dynamic grant is no earlier than a threshold time before a first symbol of the downlink transmission; and responsively prioritizing the downlink transmission.

The details of one or more embodiments of these systems and methods are set forth in the accompanying drawings and the description below. Other features, objects, and advantages of these systems and methods will be apparent from the description and drawings, and from the claims.

BRIEF DESCRIPTION OF DRAWINGS

FIG. 1 illustrates an example wireless communication system, according to some implementations of the present disclosure.

FIG. 3 illustrates a flowchart of an example method, according to some implementations of the present disclosure.

Like reference symbols in the various drawings indicate like elements.

DETAILED DESCRIPTION

Figure 2:
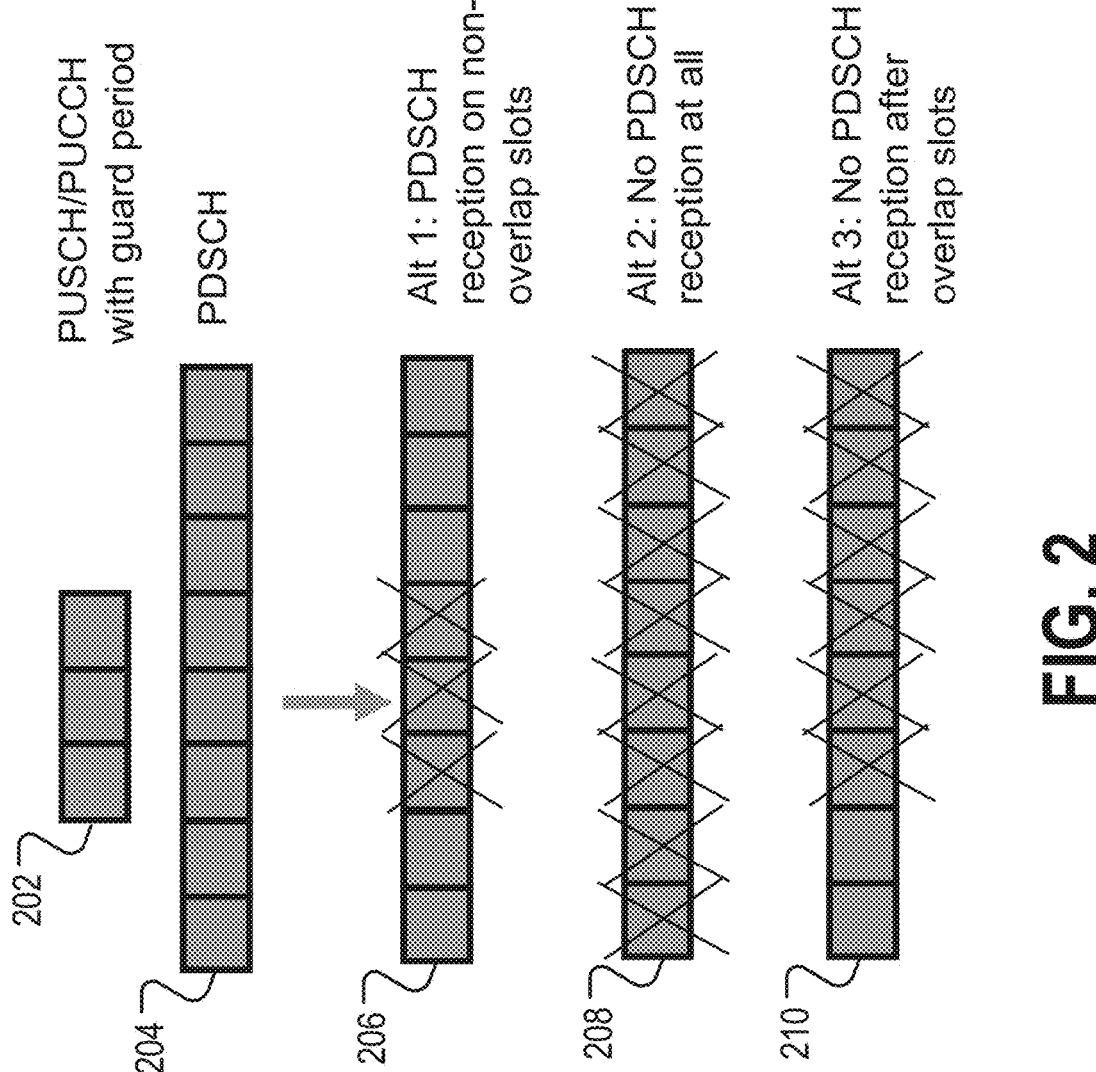
FIG. 2 illustrates an example of a conflict with repetition in at least one of the uplink and downlink communications, according to some implementations of the present disclosure.

The 3rd Generation Partnership Project (3GPP) has recently explored reduced capability devices (also called "RedCap devices") that operate using features and parameters with lower end capabilities. These devices can serve use cases including industrial wireless sensors, video surveillance, and wearables devices. Some of the features being explored for RedCap devices include support for half-duplex frequency division duplex (HD-FDD) operation, full-duplex FDD (FD-FDD) operation, and time division duplex mode. For FDD operation, there are two carrier frequencies, one for uplink transmissions, $f_{ul}$, and one for downlink transmissions, $f_{dl}$. In FD-FDD mode, a UE can simultaneously transmit and receive communications. However, an HD-FDD UE does not support simultaneous transmission and reception in order to reduce costs, e.g., by replacing a duplexer with a switch. One essential aspect of HD-FDD is to provide the possibility for a sufficiently large guard period where neither downlink nor uplink transmissions occur. This guard period helps avoid interference between uplink and downlink transmissions.

Additionally, 3GPP has released standards that integrate non-terrestrial networks (NTNs) into the 5G New Radio

4

(NR) framework. The Timing Advance (TA) applied by an NR NTN UE in RRC_IDLE/INACTIVE and RRC_CONNECTED is given by:

$$T_{TA}=(N_{TA}+N_{TA,UE\text{-}specific}+N_{TA,common}+N_{TA,offset})\times T_C \quad [1]$$

In Equation [1], $N_{TA}$ is defined as 0 for PRACH and is updated based on TA command field in Msg2/MsgB and a Medium Access Control (MAC) control element (CE) TA command. $N_{TA,UE\text{-}specific}$ is a UE self-estimated TA that pre-compensates for a service link delay. $N_{TA,common}$ is a network-controlled common TA, and may include any timing offset considered necessary by the network. An $N_{TA,common}$ with a value of 0 is supported. $N_{TA,offset}$ is a fixed offset used to calculate the TA. Note that the UE may not assume that the roundtrip time (RTT) between the UE and the base station is equal to the calculated TA for Msg1/MsgA.

Once RedCap devices are implemented in practice, it is expected that they will be served by NTNs. One issue that may result in such systems is that a moving satellite leads to continuous change of a UE's TA. Due to the continuous change, a base station serving a UE, e.g., a gNB (whether the satellite or the gNB of the NTN cell), is unaware of the UE's TA (whether the TA is cell common or UE specific). As a result, simultaneous uplink transmission and downlink reception may occur at the UE's side, which is likely to result in scheduling conflicts for HD-FDD UEs (e.g., RedCap devices).

Disclosed herein are methods and systems that enable resource-efficient HD-FDD operation by minimizing signaling overhead for HD-FDD support and avoiding or mitigating scheduling conflicts, such as those that result in NTNs. In some embodiments, the methods and systems implement prioritization rules that enable UEs to resolve scheduling conflicts between uplink and downlink communications.

FIG. 1 illustrates an example wireless communication system 100, according to some implementations. As described below, the wireless communication system 100 can include and/or communicate with a non-terrestrial network. For purposes of convenience and without limitation, the example system 100 is described in the context of Long Term Evolution (LTE) and Fifth Generation (5G) New Radio (NR) communication standards as defined by the 3GPP technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown in FIG. 1, the system 100 includes a UE 102. The UE 102 may be a smartphone (e.g., handheld touchscreen mobile computing devices connectable to one or more cellular networks), or any mobile or non-mobile computing device, such as a consumer electronics device, cellular phone, smartphone, feature phone, tablet computer, wearable computer device, networked or "smart" appliances, MTC devices, M2M, IoT devices, and/or the like. In some examples, the UE 102 may be configured to operate according to specific standards, such as RedCap standards defined by the 3GPP technical specifications. For instance, the UE 102 may be configured to operate in HD-FDD mode.

The UE 102 may be configured to connect, for example, communicatively couple, with a RAN 110. In embodiments, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UE 102 utilizes connections (or channels) 103 and 104, respectively, each of which comprises a physical communications interface or layer.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, the UE 102 may be configured to implement one or more prioritization rules 106 that enable the UE to resolve scheduling conflicts between uplink and downlink communications. In some examples, the prioritization rules 106 are associated with scheduling conflict types. Accordingly, the UE 102 may select a prioritization rule to apply based on the type of scheduling conflict. In some examples, the scheduling conflict types include: (i) a conflict between uplink and downlink communications that do not have repetition, (ii) a conflict between uplink and downlink communications with repetition in at least one of the uplink and downlink communications, and (iii) a conflict that involves a time overlap between an existing transmission configuration and a newly scheduled transmission. Note that the prioritization rules 106 may apply to any type of uplink transmission (e.g., PUSCH/PUCCH/SRS/PRACH) and any type of downlink transmission (e.g., PDCCH/PDSCH/CSI-RS/DL PRS).

In some embodiments, the UE 102 is configured to apply a first prioritization rule to a first conflict type that involves a conflict between uplink and downlink communications that do not have repetition. The UE 102 may be configured to apply different implementations of the first prioritization rule in different scenarios of the first conflict type. A first scenario of the first conflict type occurs when the UE 102 has received a dynamic downlink grant and a dynamic uplink grant. In a first implementation in the first scenario, the prioritization is performed based on respective priority indices associated with the uplink grant and the downlink grant. The respective priority index may, for example, be a one-bit index (e.g., communicated in a control signal, such as DCI). According to the first implementation, the UE 102 prioritizes the communication that has a priority index of "1." For example, if the PDSCH has a priority index of "1" and the PUSCH/PUCCH has a priority index of "0," then the UE prioritizes the PDSCH communication. Note that if the PUCCH/PUSCH is multiplexed (e.g., with control information), then the prioritization is performed by taking a high priority index value for the multiplexed PUCCH/PUSCH. For example, Uplink Control Information (UCT) with a priority index of "1" is multiplexed on the PUCCH/PUSCH, then the PUCCH/PUSCH is considered to also have a priority index of "1."

However, the uplink and downlink communications may have the same priority index. Here, different alternatives of the first implementation of the first prioritization rule are possible. The UE 102 may be configured to implement any of these alternatives. In a first alternative, the prioritization between the uplink and downlink communications is configured by the RAN 110, perhaps using RRC configuration or any other signaling method. The RAN 110 may configure the prioritization per cell or per UE. In a second alternative, uplink communications are prioritized over downlink communications. In this alternative, only PUCCH may be prioritized over PDSCH, or both PUCCH and PUSCH may be prioritized over PDSCH. This is applicable to PUCCH with HARQ-ACK feedback and/or a scheduling request (SR). In a third alternative, downlink communications are prioritized over uplink communications. In this alternative, PDSCH may only be prioritized over PUSCH, or may be prioritized over both PUSCH and PUCCH. In a fourth alternative, the prioritization is performed according to UE implementation (that is, the UE 102 determines the communication to prioritize). In a fifth alternative, the prioritization is based on a reception time of the grant (e.g., via downlink control information [DCI]). As an example, the later received of the uplink grant and the downlink grant is prioritized.

In a second implementation in the first scenario, prioritization of the communication is independent of the associated priority indices. Here, different alternatives of the second implementation are possible. The UE 102 may be configured to implement any of these alternatives. In a first alternative, the prioritization between the uplink and downlink communications is configured by the RAN 110, perhaps using RRC configuration or any other signaling method. The RAN 110 may configure the prioritization per cell or per UE. In a second alternative, uplink communications are prioritized over downlink communications. In this alternative, only PUCCH may be prioritized over PDSCH, or both PUCCH and PUSCH may be prioritized over PDSCH. This is applicable to PUCCH with HARQ-ACK feedback and/or a SR. In a third alternative, downlink communications are prioritized over uplink communications. In this alternative, PDSCH may only be prioritized over PUSCH, or may be prioritized over both PUSCH and PUCCH. In a fourth alternative, the prioritization is left for UE implementation (that is, the UE 102 determines the communication to prioritize). In a fifth alternative, the prioritization is based on the reception time of the grant DCI. As an example, the later received of the uplink grant and the downlink grant is prioritized.

A second scenario of the first conflict type occurs when the UE 102 has received a dynamic downlink grant and a configured uplink grant. In a first implementation in the second scenario, the uplink and downlink communications are prioritized based on respective priority indices associated with the uplink and the downlink communications. However, the uplink and downlink communications may have the same priority index. Here, different alternatives of the first implementation of the first prioritization rule are possible. The UE 102 may be configured to implement any of these alternatives. In a first alternative, the prioritization between the uplink and downlink communications is configured by the RAN 110, perhaps using RRC configuration or any other signaling method. The RAN 110 may configure the prioritization per cell or per UE. In a second alternative, the dynamic downlink grant is prioritized over the configured uplink grant. In a third alternative, the prioritization is left for UE implementation (that is, the UE 102 determines the communication to prioritize).

In a second implementation in the second scenario, the dynamic downlink grant is prioritized over the configured uplink grant. In a third implementation in the second scenario, the prioritization depends on UE implementation. In a third implementation in the second scenario, the prioritization is configured by the RAN 110 (e.g., per UE or per cell).

A third scenario of the first conflict type occurs when the UE 102 has received downlink semi-persistent scheduling (SPS) and a dynamic uplink grant. In a first implementation in the third scenario, the uplink and downlink communications are prioritized based on respective priority indices associated with the uplink grant and the downlink grant. However, the uplink and downlink communications may have the same priority index. Here, different alternatives are possible. The UE 102 may be configured to implement any of these alternatives. In a first alternative, the prioritization between the uplink and downlink communications is configured by the RAN 110, perhaps using RRC configuration or any other signaling method. The RAN 110 may configure the prioritization per cell or per UE.

In a second alternative, the dynamic uplink grant is prioritized over the downlink SPS. In a third alternative, the prioritization is left for UE implementation (that is, the UE 102 determines the communication to prioritize).

In a second implementation of the third scenario, the dynamic uplink grant is prioritized. In a third implementation of the third scenario, the prioritization depends on UE implementation. In a fourth implementation of the third scenario, the prioritization is configured by the RAN 110 (e.g., per UE or per cell).

A fourth scenario of the first conflict type occurs when the UE 102 has received a downlink SPS and a configured uplink grant. In a first implementation in the third scenario, the prioritization is performed based on respective priority indices associated with the uplink grant and the downlink grant. However, if the associated priority indices are the same, then there are different alternatives for determining the communication to prioritize. In a first alternative, the prioritization is based on UE implementation. In a second alternative, the configured uplink grant is prioritized. In a third alternative, the downlink SPS is prioritized. In a fourth alternative, the prioritization is configured by the RAN 110 (e.g., per UE or per cell).

In a second implementation of the fourth scenario, the configured uplink grant is always prioritized. In a third implementation of the fourth scenario, the downlink SPS is always prioritized. In a fourth implementation of the fourth scenario, the prioritization depends on UE implementation. In a fifth implementation of the fourth scenario, the prioritization is configured by the RAN 110 (e.g., per UE or per cell).

In some embodiments, the UE 102 is configured to apply a second prioritization rule to a second conflict type that involves a conflict with repetition in at least one of the uplink and downlink communications. The UE 102 may be configured to apply different implementations of the second prioritization rule in different scenarios of the second conflict type. A first scenario of the second conflict type occurs when there is a conflict between a downlink communication with repetition and an uplink communication. In a first implementation in the first scenario, the prioritization is based on respective priority indices associated with the uplink and the downlink communications. If the downlink has a lower priority index than the uplink communications, then UE 102 may be configured with one of several alternative rules. In a first alternative, the UE 102 receives downlink repetition on the slot without time overlap with the uplink communication, while the UE 102 does not receive downlink repetition on the slot with time overlap with uplink communication. In a second alternative, the UE 102 determines not to receive the entire downlink repetition. In a third alternative, the UE 102 receives downlink repetition on the slot before the time overlap with uplink communication, while the UE 102 does not receive downlink repetition on or after the slot with time overlap with uplink communication.

In some embodiments, the alternative rule that is applied depends on whether the downlink communication is an SPS downlink or a dynamic granted downlink. In dynamic grant downlink, TDRA (Time Domain Resource Allocation) entry may indicate repetition number. In SPS downlink, the configuration itself may indicate the repetition number. For example, the UE may determine to apply the second alternative rule to SPS downlink and to apply the third alternative rule to a dynamic grant downlink. Selection among different alternatives may be configured per UE or per cell. Additionally and/or alternatively, selection among different alternatives may depend on UE capability.

FIG. 2 illustrates an example of a conflict 200 with repetition in at least one of the uplink and downlink communications, according to some implementations. As shown in FIG. 2, there is a conflict between an uplink communication 202 (e.g., PUSCH/PUCCH with a guard period) and a downlink communication with repetition 204 (e.g., PDSCH). According to a first alternative rule (Alt 1), the UE 102 determines to receive the uplink communication and the downlink communication on non-overlapping slots. As shown by downlink communication 206, the UE 102 does not receive slots that overlap with the uplink communication. According to a second alternative rule (Alt 2), the UE 102 determines not to receive any of the downlink communication. As shown by downlink communication 208, the UE 102 does not receive any of the downlink slots. According to a third alternative rule (Alt 3), the UE 102 determines not to receive the overlapping slots and any subsequent slot after the overlapping slots. As shown by the downlink communication 210, the UE 102 receives the two slots prior to the overlapping slots, but does not receive the overlapping downlink slots or any subsequent downlink slot in the communication.

In the first implementation in the first scenario (i.e., prioritization is based on associated priority indices), of the downlink has higher priority index than the uplink, then the UE 102 may be configured with one of several alternative rules. In a first alternative, downlink repetition on the slot without time overlap with the uplink communication is received, while downlink repetition on the slot with time overlap with the uplink communication is not received. In a second alternative, the entire downlink repetition is received. Selection among different alternatives may be configured per UE or per cell. Additionally and/or alternatively, selection among different alternatives may depend on UE capability.

A second scenario involves prioritizing between an uplink communication with repetition and a downlink communication. In this scenario, it is first determined if the uplink communication has a lower priority index than the downlink communication. If so, the UE 102 is configured to use one of a plurality of alternative rules. In a first alternative, the uplink repetition on the slot without time overlap with the downlink communication is transmitted, while the repetition on the slot with time overlap with the downlink communication is not transmitted. In a second alternative, the entire uplink communication is not transmitted. In a third alternative, the uplink repetition on the slot before the time overlap with the downlink communication is transmitted, while the uplink repetition on or after the slot with time overlap with the downlink communication is not transmitted.

However, if the uplink communication has a higher priority index than the downlink communication, then the UE 102 is configured to use one of a plurality of other alternative rules. In a first alternative, the uplink repetition on the slot without time overlap with the downlink communication is transmitted, while the uplink repetition on the slot with time overlap with the downlink communication is not transmitted. In a second alternative, the entire uplink repetition is transmitted.

In some embodiments, different alternatives may apply to configured grant PUSCH and dynamic granted PUSCH. In dynamic grant PUSCH, TDRA (Time Domain Resource Allocation) entry may indicate a repetition number. In configured grant PUSCH, the configuration itself or activating DCI may indicate a repetition number. For example, the second alternative is applied to a configured grant PUSCH and the third option is applied to a dynamic grant PUSCH. Note that selection among different alternatives may be configured per UE or per cell. Additionally and/or alternatively, selection among different alternatives may depend on UE capability.

A third scenario involves prioritizing between uplink communications with repetition and downlink communications with repetition. This scenario can be handled similar to the first and second scenarios of the second rule.

In some embodiments, the UE 102 is configured to apply a third prioritization rule to a third conflict type that involves a time overlap between an existing communication configuration and a newly scheduled communication. The time overlap may include a guard period. The UE 102 may be configured to apply different implementations of the third rule in different scenarios of the third conflict type. A first scenario involves a conflict between configured uplink communication and a newly received dynamic downlink grant. In this scenario, the UE 102 is configured with PUSCH/PUCCH transmissions and the UE 102 receives a dynamic grant PDCCH whose scheduled PDSCH has time overlap with the PUSCH/PUCCH transmissions. In an implementation, if the last symbol of the control resource set including the PDCCH is no earlier than a threshold time before the first symbol of configured PUSCH/PUCCH, then the configured PUSCH/PUCCH is transmitted, irrespective of the priority index of the PDCCH and PUSCH/PUCCH.

A second scenario involves a conflict between an SPS downlink and a newly received dynamic uplink grant PUSCH/PUCCH. In this scenario, the UE 102 is configured to receive PDSCH and then the UE 102 receives an uplink grant whose scheduled PUSCH has time overlap with the PDSCH reception. In an implementation, if the last symbol of the control resource set containing the uplink grant is no earlier than a threshold time before the first symbol of configured PDSCH, then the configured PDSCH is received, irrespective of the priority index of the PDSCH/PDCCH and PUSCH/PUCCH.

A third scenario involves a conflict between a dynamic downlink grant and a dynamic uplink grant. In this scenario, if the uplink grant is received first, the UE 102 is scheduled by the uplink grant to transmit PUSCH. The UE 102 may then receive a downlink grant to receive a PDSCH that has a time overlap with the PUSCH transmission. In one implementation, if the last symbol of the control resource set containing the downlink grant DCI is received no earlier than a threshold time before the first symbol of scheduled PUSCH, then the scheduled PUSCH is transmitted and the PDSCH is not received, irrespective of the priority index of the PDSCH.

However, if the downlink grant is received first, the UE 102 is scheduled by the downlink grant to receive PDSCH. The UE 102 may then receive an uplink grant that schedules the UE to transmit PUSCH at a time that overlaps with the PDSCH reception. In one implementation, if the last symbol of the control resource set containing the uplink grant DCI is received no earlier than a threshold time before the first symbol of scheduled PDSCH, then the scheduled PDSCH is received and the PUSCH is not transmitted, irrespective of the priority index of the PUSCH.

In some embodiments, the threshold time may be a network configured threshold (e.g., a predetermined threshold) or may be a UE calculated threshold time based on one or more variables. In one example, the threshold time is $T_{proc,2}$ as defined in 3GPP TS 38.214. In some examples, $N\_2$ which depends on SCS or UE capability (See Table 6.4-1 and Table 6.4-2 in TS38.214).

$d\_\{2,2\}$ which depends on BWP switching time $d\_\{2\}$ which is reported by UE.

FIG. 3 illustrates a flowchart of an example method 300, according to some implementations. For clarity of presentation, the description that follows generally describes method 300 in the context of the other figures in this description. For example, method 300 can be performed by the UE 102 of FIG. 1. As described above, the UE 102 may operate in a wireless communication system 100 that includes a non-terrestrial network (NTN) that serves the UE 102. Additionally, the UE 102 supports half-duplex frequency division duplex (HD-FDD) mode. It will be understood that method 300 can be performed, for example, by any suitable system, environment, software, hardware, or a combination of systems, environments, software, and hardware, as appropriate. In some implementations, various steps of method 300 can be run in parallel, in combination, in loops, or in any order.

At 302, method 300 involves determining a scheduling conflict between an uplink transmission and a downlink reception.

At 304, method 300 involves determining a type of the scheduling conflict.

At step 306, method 300 involves applying, based on in part on the type of the scheduling conflict, a prioritization rule that prioritizes at least a portion of the uplink transmission or the downlink reception in order to mitigate the scheduling conflict.

In some implementations, method 300 further involves receiving the prioritized at least a portion of the uplink transmission or the downlink reception.

In some implementations, determining a type of the scheduling conflict involves: determining that the type of the scheduled conflict is a conflict without repetition in the uplink transmission and the downlink reception.

In some implementations, the prioritization rule prioritizes between the uplink transmission and the downlink reception based on respective priority indices associated with the uplink transmission and the downlink reception.

In some implementations, applying the prioritization rule involves: comparing the respective priority indices, and determining to prioritize the communication with a higher priority index.

In some implementations, applying the prioritization rule involves: comparing the respective priority indices; determining that the respective priority indices are identical; and in response, performing one of a plurality of alternative options, the alternative options including: (i) prioritizing the uplink transmission, (ii) prioritizing the downlink transmission, (iii) prioritizing the uplink transmission or downlink transmission based on configuration, and (iv) prioritizing based on respective reception times of grants associated with the uplink transmission and the downlink reception.

In some implementations, determining a type of the scheduling conflict involves: determining that the type of the scheduled conflict is a conflict with repetition in at least one of the uplink transmission or the downlink reception.

In some implementations, the prioritization rule prioritizes between the uplink transmission and the downlink reception based on respective priority indices associated with the uplink transmission and the downlink reception.

In some implementations, the downlink reception includes repetition, and applying the prioritization rule involves determining whether the respective priority index of the downlink reception is lower than the respective priority index of the uplink transmission; if the respective priority index of the downlink reception is lower: performing one of a first plurality of alternative options including: (i) prioritizing a first portion of the downlink repetition without time overlap with the uplink transmission, while a second portion of the downlink repetition with time overlap with the uplink transmission is not prioritized, (ii) determining not to prioritize the entire downlink transmission, and (iii) prioritizing a third portion of the downlink repetition before the time overlap with the uplink transmission, while the downlink repetition on or after the time overlap with the uplink transmission is not prioritized; and if the respective priority index of the downlink reception is greater: performing one of a second plurality of alternative options including: (i) prioritizing the first portion of the downlink repetition without time overlap with the uplink transmission, while the second portion of the downlink repetition with time overlap with the uplink transmission is not prioritized, and (ii) prioritizing the entire downlink repetition.

In some implementations, determining a type of the scheduling conflict involves: determining that the type of the scheduled conflict is a conflict that involves a time overlap between an existing communication configuration and a newly scheduled communication.

In some implementations, the existing communication configuration is the uplink transmission, the newly scheduled communication is the downlink reception that overlaps in time with the uplink transmission and that is scheduled by a dynamic grant, and applying the prioritization rule involves; determining that a last symbol of a control resource set including the dynamic grant is no earlier than a threshold time before a first symbol of the uplink transmission; and responsively prioritizing the uplink transmission.

In some implementations, the existing communication configuration is the downlink reception, the newly scheduled communication is the uplink transmission that overlaps in time with the downlink reception and that is scheduled by a dynamic grant, and applying the prioritization rule involves: determining that a last symbol of the control resource set containing the dynamic grant is no earlier than a threshold time before a first symbol of the downlink transmission; and responsively prioritizing the downlink transmission.

Also disclosed are one or more systems of one or more computers configured to perform particular operations or actions by virtue of having software, firmware, hardware, or a combination of them installed on the system that in operation causes or cause the system to perform the actions of the method 300. One or more computer programs can be configured to perform particular operations or actions by virtue of including instructions that, when executed by data processing apparatus, cause the apparatus to perform the actions of the method 300.

Other embodiments of this aspect include corresponding computer systems, apparatus, and computer programs recorded on one or more computer storage devices, each configured to perform the actions of the method 300.

Figure 4:
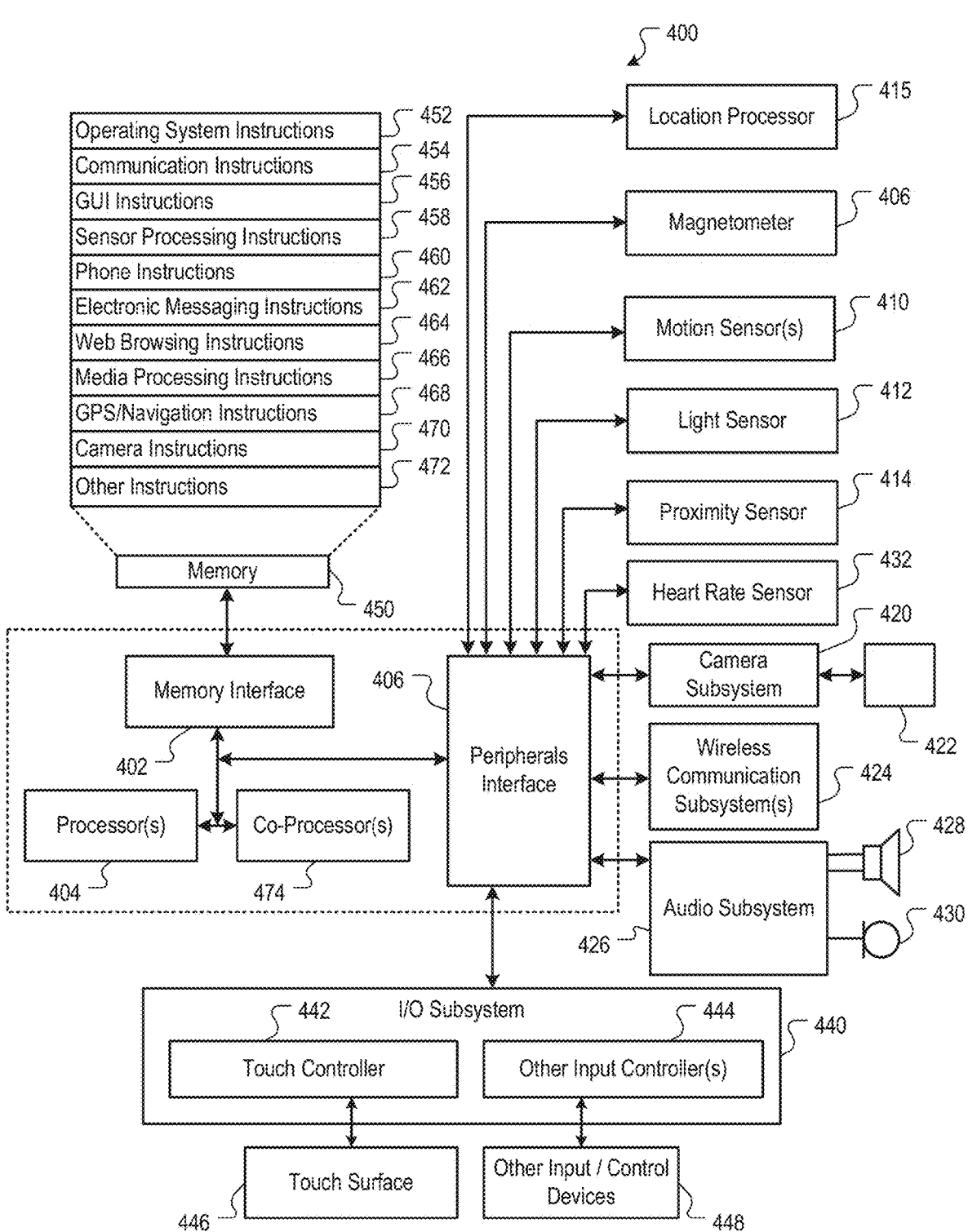
FIG. 4 is a block diagram of an example device architecture, according to some implementations of the present disclosure.

FIG. 4 is a block diagram of an example device architecture 400 for implementing the features and processes described in reference to FIGS. 1-3. For example, the architecture 400 can be used to implement a user equipment (UE), such as UE 102. Architecture 400 may be implemented in any device for generating the features described in reference to FIGS. 1-3, including but not limited to desktop computers, server computers, portable computers, smart phones, tablet computers, game consoles, wearable computers, set top boxes, media players, smart TVs, and the like.

The architecture 400 can include a memory interface 402, one or more data processor 404, one or more data co-processors 474, and a peripherals interface 406. The memory interface 402, the processor(s) 404, the co-processor(s) 474, and/or the peripherals interface 406 can be separate components or can be integrated in one or more integrated circuits. One or more communication buses or signal lines may couple the various components.

The processor(s) 404 and/or the co-processor(s) 474 can operate in conjunction to perform the operations described herein. For instance, the processor(s) 404 can include one or more central processing units (CPUs) that are configured to function as the primary computer processors for the architecture 400. As an example, the processor(s) 404 can be configured to perform generalized data processing tasks of the architecture 400. Further, at least some of the data processing tasks can be offloaded to the co-processor(s) 474. For example, specialized data processing tasks, such as processing motion data, processing image data, encrypting data, and/or performing certain types of arithmetic operations, can be offloaded to one or more specialized co-processor(s) 474 for handling those tasks. In some cases, the processor(s) 404 can be relatively more powerful than the co-processor(s) 474 and/or can consume more power than the co-processor(s) 474. This can be useful, for example, as it enables the processor(s) 404 to handle generalized tasks quickly, while also offloading certain other tasks to co-processor(s) 474 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 404 for further analysis.

Sensors, devices, and subsystems can be coupled to peripherals interface 406 to facilitate multiple functionalities. For example, a motion sensor 410, a light sensor 412, and a proximity sensor 414 can be coupled to the peripherals interface 406 to facilitate orientation, lighting, and proximity functions of the architecture 400. For example, in some implementations, a light sensor 412 can be utilized to facilitate adjusting the brightness of a touch surface 446. In some implementations, a motion sensor 410 can be utilized to detect movement and orientation of the device. For example, the motion sensor 410 can include one or more accelerometers (e.g., to measure the acceleration experienced by the motion sensor 410 and/or the architecture 400 over a period of time), and/or one or more compasses or gyros (e.g., to measure the orientation of the motion sensor 410 and/or the mobile device). In some cases, the measurement information obtained by the motion sensor 410 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 410 can be directly integrated into a co-processor 474 configured to processes measurements obtained by the motion sensor 410. For example, a co-processor 474 can include one more accelerometers, compasses, and/or gyroscopes, and can be configured to obtain sensor data from each of these sensors, process the sensor data, and transmit the processed data to the processor(s) 404 for further analysis.

Other sensors may also be connected to the peripherals interface 406, such as a temperature sensor, a biometric sensor, or other sensing device, to facilitate related functionalities. As an example, as shown in FIG. 4, the architecture 400 can include a heart rate sensor 432 that measures the beats of a user's heart. Similarly, these other sensors also can be directly integrated into one or more co-processor(s) 474 configured to process measurements obtained from those sensors.

A location processor 415 (e.g., a GNSS receiver chip) can be connected to the peripherals interface 406 to provide geo-referencing. An electronic magnetometer 416 (e.g., an integrated circuit chip) can also be connected to the peripherals interface 406 to provide data that may be used to determine the direction of magnetic North. Thus, the electronic magnetometer 416 can be used as an electronic compass.

A camera subsystem 420 and an optical sensor 422 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 424. The communication subsystem(s) 424 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 424 can depend on the communication network(s) or medium(s) over which the architecture 400 is intended to operate. For example, the architecture 400 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 400 can be configured as a base station for other wireless devices. As another example, the communication subsystems 424 may allow the architecture 400 to synchronize with a host device using one or more protocols, such as, for example, the TCP/IP protocol, HTTP protocol, UDP protocol, and any other known protocol.

An audio subsystem 426 can be coupled to a speaker 428 and one or more microphones 430 to facilitate voice-enabled functions, such as voice recognition, voice replication, digital recording, and telephony functions.

An I/O subsystem 440 can include a touch controller 442 and/or other input controller(s) 444. The touch controller 442 can be coupled to a touch surface 446. The touch surface 446 and the touch controller 442 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 446. In one implementations, the touch surface 446 can display virtual or soft buttons and a virtual keyboard, which can be used as an input/output device by the user.

Other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of the speaker 428 and/or the microphone 430.

In some implementations, the architecture 400 can present recorded audio and/or video files, such as MP3, AAC, and MPEG video files. In some implementations, the architecture 400 can include the functionality of an MP3 player and may include a pin connector for tethering to other devices. Other input/output and control devices may be used.

A memory interface 402 can be coupled to a memory 450. The memory 450 can include high-speed random access memory or non-volatile memory, such as one or more magnetic disk storage devices, one or more optical storage devices, or flash memory (e.g., NAND, NOR). The memory 450 can store an operating system 452, such as Darwin, RTXC, LINUX, UNIX, OS X, WINDOWS, ANDROID, or an embedded operating system such as VxWorks. The operating system 452 can include instructions for handling basic system services and for performing hardware dependent tasks. In some implementations, the operating system 452 can include a kernel (e.g., UNIX kernel).

The memory 450 can also store communication instructions 454 to facilitate communicating with one or more additional devices, one or more computers or servers, including peer-to-peer communications. The communication instructions 454 can also be used to select an operational mode or communication medium for use by the device, based on a geographic location (obtained by the GPS/Navigation instructions 468) of the device. The memory 450 can include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and other instructions 472 for performing some or all of the processes described herein.

Each of the above identified instructions and applications can correspond to a set of instructions for performing one or more functions described herein. These instructions need not be implemented as separate software programs, procedures, or modules. The memory 450 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a standalone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An APT may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Figure 5:
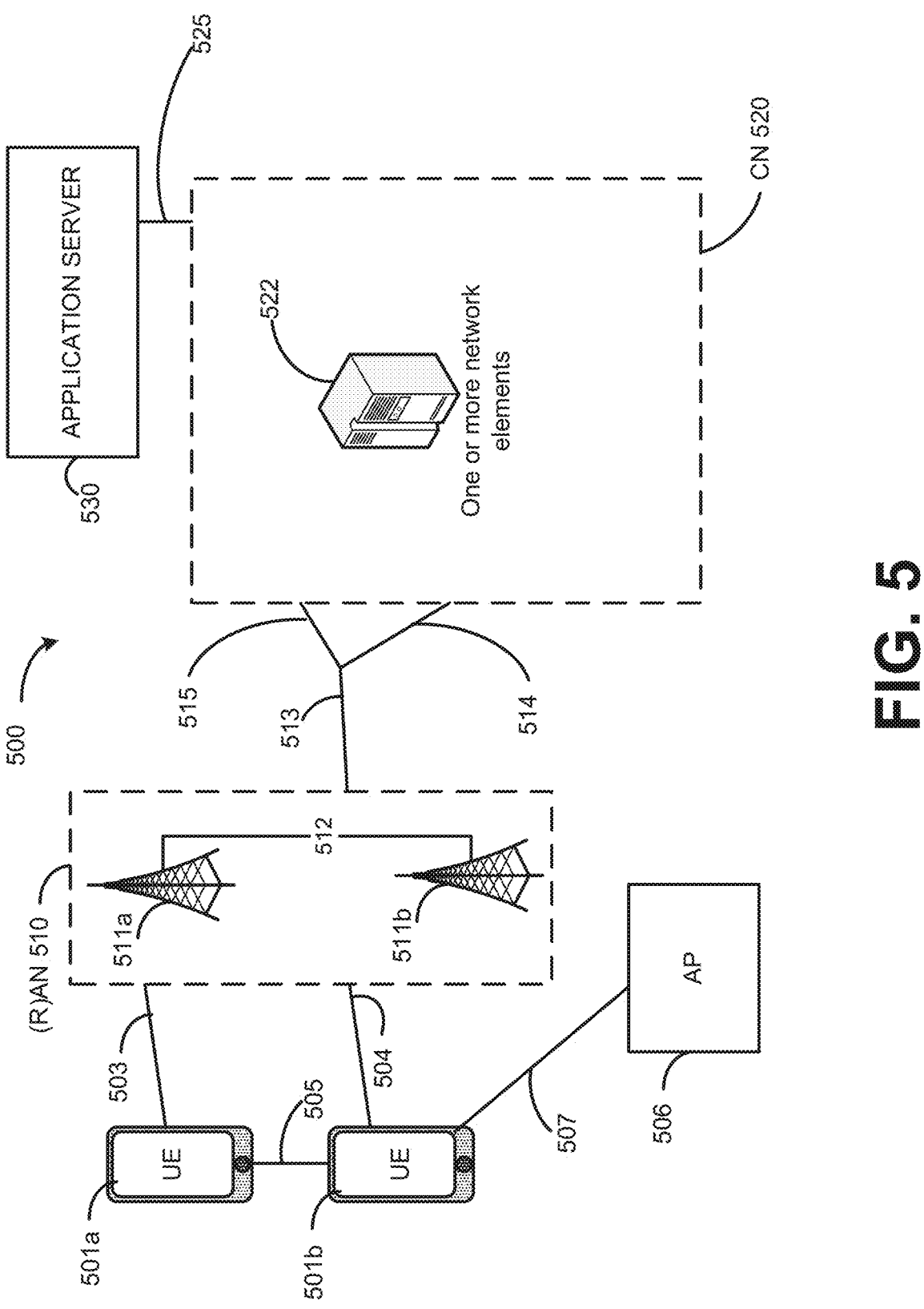
FIG. 5 illustrates an example of a wireless communication system, according to some implementations of the present disclosure.

FIG. 5 illustrates an example of a wireless communication system 500. The wireless system 500 can include and/or communicate with the non-terrestrial network 100. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 500 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 500 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 5, the system 500 includes UE 501*a* and UE 501*b* (collectively referred to as "UEs 501" or "UE 501"). In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with RAN 510. In embodiments, the RAN 510 may be an NG RAN or a 5G RAN, an E-UTRAN, a non-terrestrial cell, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UEs 501 may directly exchange communication data via a ProSe interface 505. The ProSe interface 505 may alternatively be referred to as a SL interface 505 and may comprise one or more logical channels, including but not limited to a PSCCH, a PSSCH, a PSDCH, and a PSBCH.

The UE 501*b* is shown to be configured to access an AP 506 (also referred to as "WLAN node 506," "WLAN 506," "WLAN Termination 506," "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501*b*, RAN 510, and AP 506 may be configured to utilize LWA operation and/or LWIP operation. The LWA operation may involve the UE 501*b* in RRC_CO-NNECTED being configured by a RAN node 511*a-b* to utilize radio resources of LTE and WLAN. LWIP operation may involve the UE 501*b* using WLAN radio resources (e.g., connection 507) via IPsec protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511*a* and 511*b* (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femto-cells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB-DUs that are connected to a gNB-CU via individual F1 interfaces (not shown by FIG. 5). In these implementations, the gNB-DUs may include one or more remote radio heads or RFEMs (see, e.g., FIG. 6), and the gNB-CU may be operated by a server that is located in the RAN 510 (not shown) or by a server pool in a similar manner as the CRAN/vBBUP. Additionally or alternatively, one or more of the RAN nodes 511 may be next generation eNBs (ngeNBs), which are RAN nodes that provide E-UTRA user plane and control plane protocol terminations toward the UEs 501, and are connected to a 5GC via an NG interface (discussed infra).

In V2X scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501 and the RAN nodes 511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 501 and the RAN nodes 511 may operate using LAA, eLAA, and/or feLAA mechanisms. In these implementations, the UEs 501 and the RAN nodes 511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501 RAN nodes 511, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 501, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The PDCCH carries information about the transport format and resource allocations related to the PDSCH channel, among other things. It may also inform the UEs 501 about the transport format, resource allocation, and HARQ information related to the uplink shared channel. Typically, downlink scheduling (assigning control and shared channel resource blocks to the UE 501*b* within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 511 may be configured to communicate with one another via interface 512. In embodiments where the system 500 is an LTE system, the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system, the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network-in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS PS domain, LTE PS data services, etc.). The application server 530 can also be configured to support one or more communication services (e.g., VoIP sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the S1 control plane (NG-C) interface 515, which is a signaling interface between the RAN nodes 511 and AMFs.

Tn embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an S1 interface 513. In embodiments, the S1 interface 513 may be split into two parts, an S1 user plane (S1-U) interface 514, which carries traffic data between the RAN nodes 511 and the S-GW, and the S1-MME interface 515, which is a signaling interface between the RAN nodes 511 and MMEs.

Figure 6:
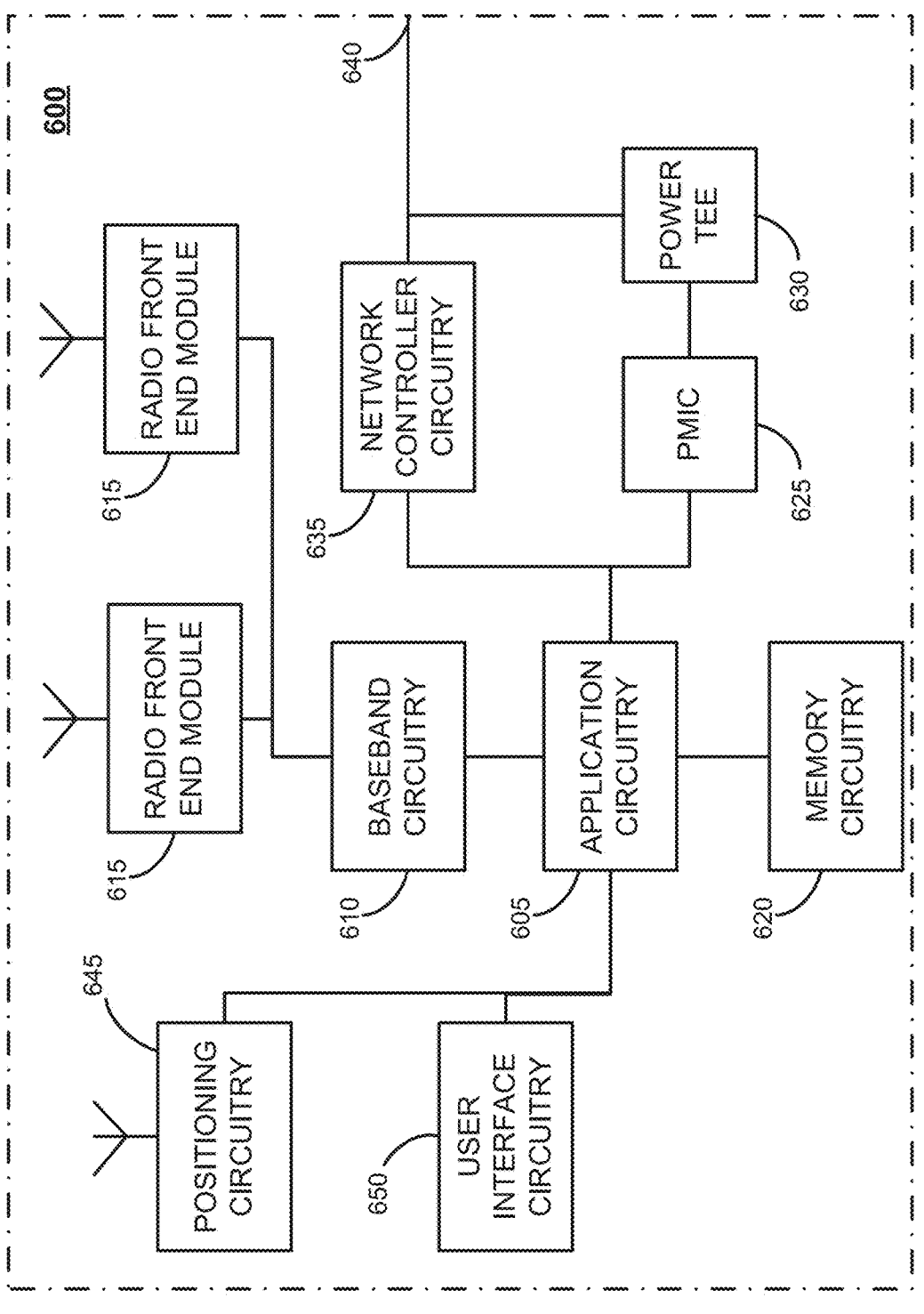
FIG. 6 illustrates an example of infrastructure equipment, according to some implementations of the present disclosure.

FIG. 6 illustrates an example of infrastructure equipment 600 in accordance with various embodiments. The infrastructure equipment 600 (or "system 600") may be implemented as a base station, radio head, non-terrestrial base station, RAN node such as the RAN nodes 511 and/or AP 506 shown and described previously, application server(s) 530, and/or any other element/device discussed herein. In other examples, the system 600 could be implemented in or by a UE.

The system 600 includes application circuitry 605, baseband circuitry 610, one or more radio front end modules (RFEMs) 615, memory circuitry 620, power management integrated circuitry (PMIC) 625, power tee circuitry 630, network controller circuitry 635, network interface connector 640, satellite positioning circuitry 645, and user interface circuitry 650. In some embodiments, the device 600 may include additional elements such as, for example, memory/ storage, display, camera, sensor, or input/output (I/O) interface. In other embodiments, the components described below may be included in more than one device. For example, said circuitries may be separately included in more than one device for CRAN, vBBU, or other like implementations.

Application circuitry 605 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 605 may comprise, or may be, a special-purpose processor/controller to operate according to the various embodiments herein. As examples, the processor(s) of application circuitry 605 may include one or more may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cavium™, Inc.; a MIPS-based design from MIPS Technologies, Inc. Such as MIPS Warrior P-class processors; and/or the like. In some embodiments, the system 600 may not utilize application circuitry 605, and instead may include a special-purpose processor/controller to process IF data received from an EPC or 5GC, for example.

Tn some implementations, the application circuitry 605 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 605 may comprise logic blocks or logic fabric, and other interconnected resources that may be programmed to perform various functions, such as the procedures, methods, functions, etc. Of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 610 are discussed infra with regard to FIG. 7.

User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 615, which incorporates both mmWave antennas and sub-mmWave.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The positioning circuitry 645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-Technology for Positioning, Navigation, and Timing (Micro-PNT) IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various infrastructure (e.g., RAN nodes 511, etc.), or the like.

The components shown by FIG. 6 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 7:
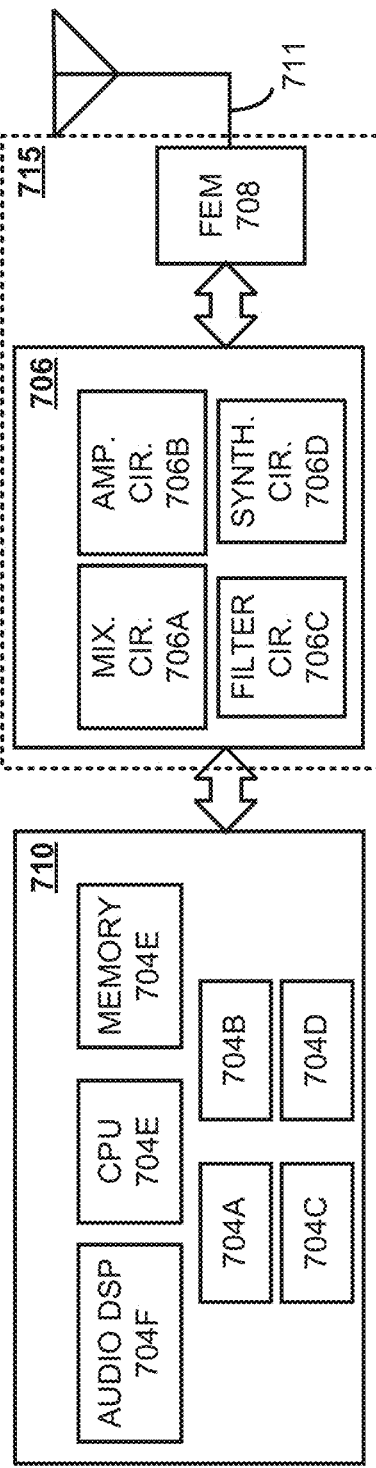
FIG. 7 illustrates example components of baseband circuitry and radio front end modules (RFEM), according to some implementations of the present disclosure.

FIG. 7 illustrates example components of baseband circuitry 710 and radio front end modules (RFEM) 715 in accordance with various embodiments. The baseband circuitry 710 corresponds to the baseband circuitry 610 of FIG. 6. The RFEM 715 corresponds to the RFEM 615 of FIG. 6. As shown, the RFEMs 715 may include Radio Frequency (RF) circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry 605 (see FIG. 6) for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., sixth generation (6G), etc.). In other embodiments, some or all of the functionality of baseband processors 704A-D may be included in modules stored in the memory 704G and executed via a Central Processing Unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry 605 of FIG. 6); an RF circuitry interface to send/receive data to/from RF circuitry 706 of FIG. 7; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from a PMIC.

In alternate embodiments (which may be combined with the above described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

Although not shown by FIG. 7, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and logical link control (LLC) functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a system on a chip (SoC) or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry 605 may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with an E-UTRAN or other WMAN, a WLAN, a WPAN. Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. To facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 710 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 710 or the application circuitry 605 depending on the desired output frequency. In some embodiments, a divider control input (e.g., N) may be determined from a look-up table based on a channel indicated by the application circuitry 605.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

Processors of the application circuitry 605 and processors of the baseband circuitry 710 may be used to execute elements of one or more instances of a protocol stack. For example, processors of the baseband circuitry 710, alone or in combination, may be used execute Layer 3, Layer 2, or Layer 1 functionality, while processors of the application circuitry 605 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 8:
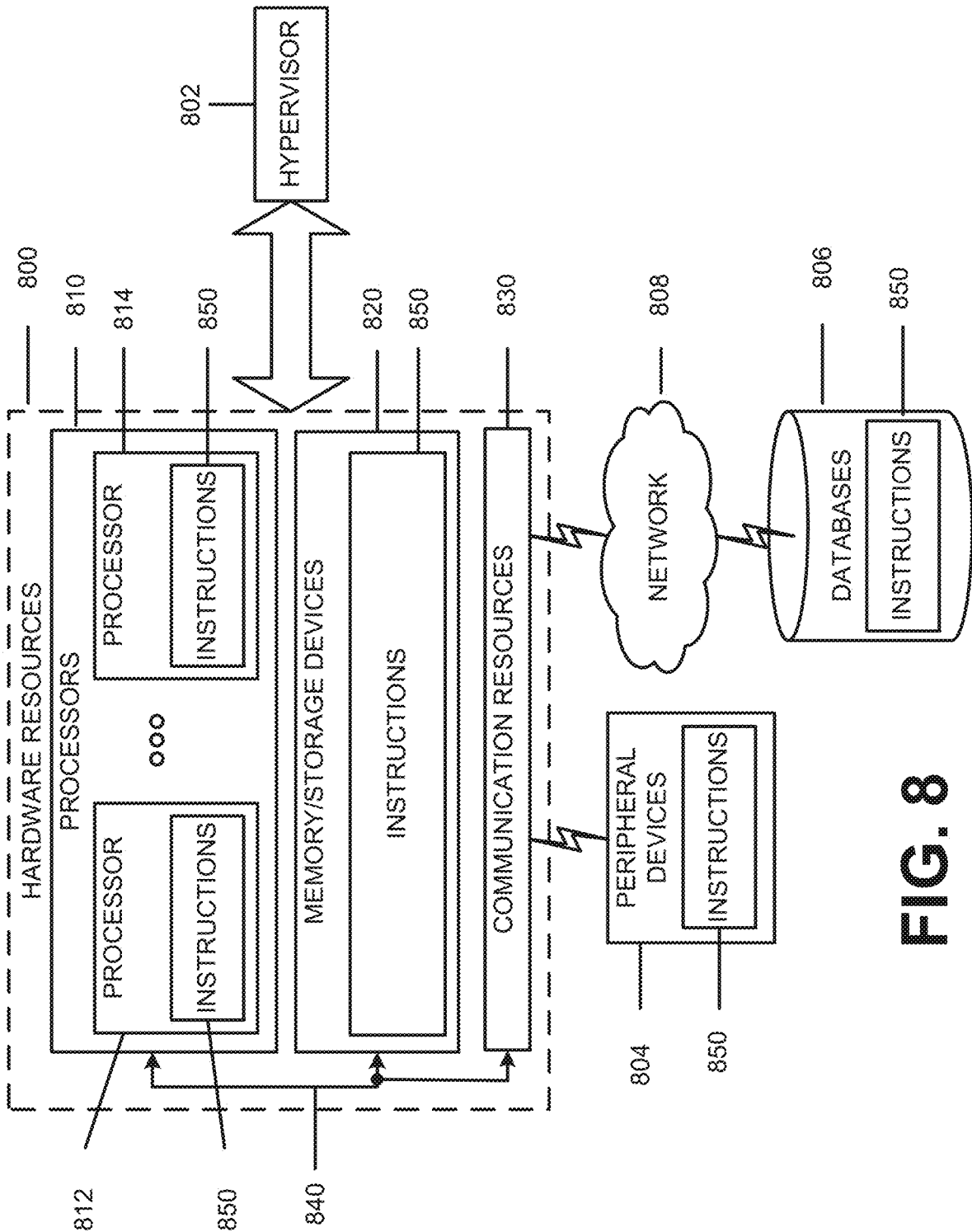
FIG. 8 is a block diagram illustrating components able to read instructions from a machine-readable or computer-readable medium (e.g., a non-transitory machine-readable storage medium) and perform any one or more of the methodologies discussed herein, according to some implementations of the present disclosure.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processor(s) 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via USB), cellular communication components, NFC components, Bluetooth® or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A method comprising:
   determining a scheduling conflict between an uplink transmission to a non-terrestrial network (NTN) and a downlink reception from the NTN;
   determining, based on the scheduling conflict between the uplink transmission to the NTN and the downlink reception from the NTN, that a prioritization between the uplink transmission and the downlink reception is not configured; and
in response to the prioritization not being configured:
   based on a last symbol of a control resource set comprising a downlink control information (DCI) being received earlier than a threshold time before a first symbol of the uplink transmission in a time domain, prioritizing the downlink reception over the uplink transmission, wherein the DCI schedules the downlink reception, and
   based on the last symbol not being received earlier than the threshold time, prioritizing the uplink transmission over the downlink reception.

2. The method of claim 1, wherein the uplink transmission is a dynamic grant uplink transmission and the downlink reception is a dynamic grant downlink reception.

3. The method of claim 1, wherein prioritizing the downlink reception comprises:
   canceling the uplink transmission; and
   identifying the downlink reception.

4. The method of claim 1, wherein prioritizing the uplink transmission comprises:
   determining not to receive the downlink reception; and
   causing the uplink transmission.

5. The method of claim 1, wherein the downlink reception comprises a reception of at least one of a physical downlink shared channel (PDSCH) or a channel state information reference signal (CSI-RS).

6. The method of claim 1, wherein the uplink transmission comprises a transmission of at least one of a physical uplink shared channel (PUSCH), a physical uplink control channel (PUCCH), or a sounding reference signal (SRS).

7. The method of claim 1, wherein the threshold time is configured by a network or calculated by a user equipment (UE).

8. A user equipment (UE) comprising:
   one or more processors configured to, when executing instructions stored in a memory, perform operations comprising:
   determining a scheduling conflict between an uplink transmission to a non-terrestrial network (NTN) and a downlink reception from the NTN;
   determining, based on the scheduling conflict between the uplink transmission to the NTN and the downlink reception from the NTN, that a prioritization between the uplink transmission and the downlink reception is not configured; and
   in response to the prioritization not being configured:
      based on a last symbol of a control resource set comprising a downlink control information (DCI) being received earlier than a threshold time before a first symbol of the uplink transmission in a time domain, prioritizing the downlink reception over the uplink transmission, wherein the DCI schedules the downlink reception, and
      based on the last symbol not being received earlier than the threshold time, prioritizing the uplink transmission over the downlink reception.

9. The UE of claim 8, wherein the uplink transmission is a dynamic grant uplink transmission and the downlink reception is a dynamic grant downlink reception.

10. The UE of claim 8, wherein prioritizing the downlink reception comprises:
   canceling the uplink transmission; and
   identifying the downlink reception.

11. The UE of claim 8, wherein prioritizing the uplink transmission comprises:

determining not to receive the downlink reception; and causing the uplink transmission.

12. The UE of claim 8, wherein the downlink reception comprises a reception of at least one of a physical downlink shared channel (PDSCH) or a channel state information reference signal (CSI-RS).

13. The UE of claim 8, wherein the uplink transmission comprises a transmission of at least one of a physical uplink shared channel (PUSCH), a physical uplink control channel (PUCCH), or a sounding reference signal (SRS).

14. The UE of claim 8, wherein the threshold time is configured by a network or calculated by the UE.

15. One or more processors configured, when executing instructions stored in a memory, to perform operations comprising:

determining a scheduling conflict between an uplink transmission to a non-terrestrial network (NTN) and a downlink reception from the NTN;

determining, based on the scheduling conflict between the uplink transmission to the NTN and the downlink reception from the NTN, that a prioritization between the uplink transmission and the downlink reception is not configured; and in response to the prioritization not being configured:

based on a last symbol of a control resource set comprising a downlink control information (DCI) being received earlier than a threshold time before a first symbol of the uplink transmission in a time domain, prioritizing the downlink reception over the uplink transmission, wherein the DCI schedules the downlink reception, and based on the last symbol not being received earlier than the threshold time, prioritizing the uplink transmission over the downlink reception.

16. The one or more processors of claim 15, wherein prioritizing the downlink reception comprises:

canceling the uplink transmission; and identifying the downlink reception.

17. The one or more processors of claim 15, wherein prioritizing the uplink transmission comprises:

determining not to receive the downlink reception; and causing the uplink transmission.

18. The one or more processors of claim 15, wherein the uplink transmission is a dynamic grant uplink transmission and the downlink reception is a dynamic grant downlink reception.

19. The one or more processors of claim 15, wherein the downlink reception comprises a reception of at least one of a physical downlink shared channel (PDSCH) or a channel state information reference signal (CSI-RS), and wherein the uplink transmission comprises a transmission of at least one of a physical uplink shared channel (PUSCH), a physical uplink control channel (PUCCH), or a sounding reference signal (SRS).

20. The one or more processors of claim 15, wherein the threshold time is configured by a network or calculated by the one or more processors.

* * * * *